United States Patent
Joyce

(10) Patent No.: US 9,545,743 B2
(45) Date of Patent: Jan. 17, 2017

(54) READILY STRIPPABLE CABLE

(71) Applicant: Craig M Joyce, Auburn, NH (US)

(72) Inventor: Craig M Joyce, Auburn, NH (US)

( * ) Notice: Subject to any disclaimer, the term of this patent is extended or adjusted under 35 U.S.C. 154(b) by 0 days.

(21) Appl. No.: 14/826,483

(22) Filed: Aug. 14, 2015

(65) Prior Publication Data
US 2016/0049223 A1 Feb. 18, 2016

Related U.S. Application Data

(60) Provisional application No. 62/070,161, filed on Aug. 18, 2014.

(51) Int. Cl.
| | |
|---|---|
| *H01B 7/00* | (2006.01) |
| *B29C 47/00* | (2006.01) |
| *H01B 7/08* | (2006.01) |
| *H01B 13/14* | (2006.01) |
| *B29C 47/02* | (2006.01) |
| *H02G 1/12* | (2006.01) |
| *B29K 101/00* | (2006.01) |
| *B29K 105/04* | (2006.01) |
| *B29L 9/00* | (2006.01) |
| *B29L 31/34* | (2006.01) |

(52) U.S. Cl.
CPC ........... *B29C 47/003* (2013.01); *B29C 47/027* (2013.01); *H01B 7/0823* (2013.01); *H01B 13/143* (2013.01); *H02G 1/1273* (2013.01); *H02G 1/1295* (2013.01); *B29C 47/0021* (2013.01); *B29K 2101/00* (2013.01); *B29K 2105/045* (2013.01); *B29K 2105/046* (2013.01); *B29K 2995/0098* (2013.01); *B29L 2009/00* (2013.01); *B29L 2031/3412* (2013.01); *B29L 2031/3462* (2013.01)

(58) Field of Classification Search
USPC .......... 174/110 R, 112, 113 R, 117 R, 117 F, 174/117 FF
See application file for complete search history.

(56) References Cited

U.S. PATENT DOCUMENTS

| | | | | |
|---|---|---|---|---|
| 2,628,998 | A * | 2/1953 | Frisbie ................. | H01B 7/0823 174/112 |
| 4,467,138 | A * | 8/1984 | Brorein ................ | G02B 6/4403 174/115 |
| 4,663,098 | A * | 5/1987 | Gilliam ................ | H01B 7/0823 174/117 F |
| 4,777,325 | A * | 10/1988 | Siwinski .............. | H01B 7/0876 174/113 AS |
| 4,783,579 | A * | 11/1988 | Brandolf ............. | B29C 47/0019 156/55 |
| 5,486,654 | A * | 1/1996 | Hanak .................. | H01B 7/0876 174/113 R |
| 6,363,192 | B1 * | 3/2002 | Spooner .............. | G02B 6/4416 174/115 |
| 6,545,222 | B2 * | 4/2003 | Yokokawa .......... | G02B 6/4495 174/110 R |
| 6,563,990 | B1 * | 5/2003 | Hurley ................ | G02B 6/4422 385/101 |
| 6,734,364 | B2 * | 5/2004 | Price ................... | H01B 7/0853 174/113 C |

\* cited by examiner

*Primary Examiner* — William H Mayo, III
(74) *Attorney, Agent, or Firm* — Maine Cernota & Rardin

(57) ABSTRACT

A cable having conductors that may be easily exposed in preparation for electrical connection, without requiring the use of tools, is provided. The insulating layer of the cable has at least one relatively weak portion extending along the length of the cable that is configured to allow the insulating layer to split, thereby exposing the wire without the use of tools.

20 Claims, 7 Drawing Sheets

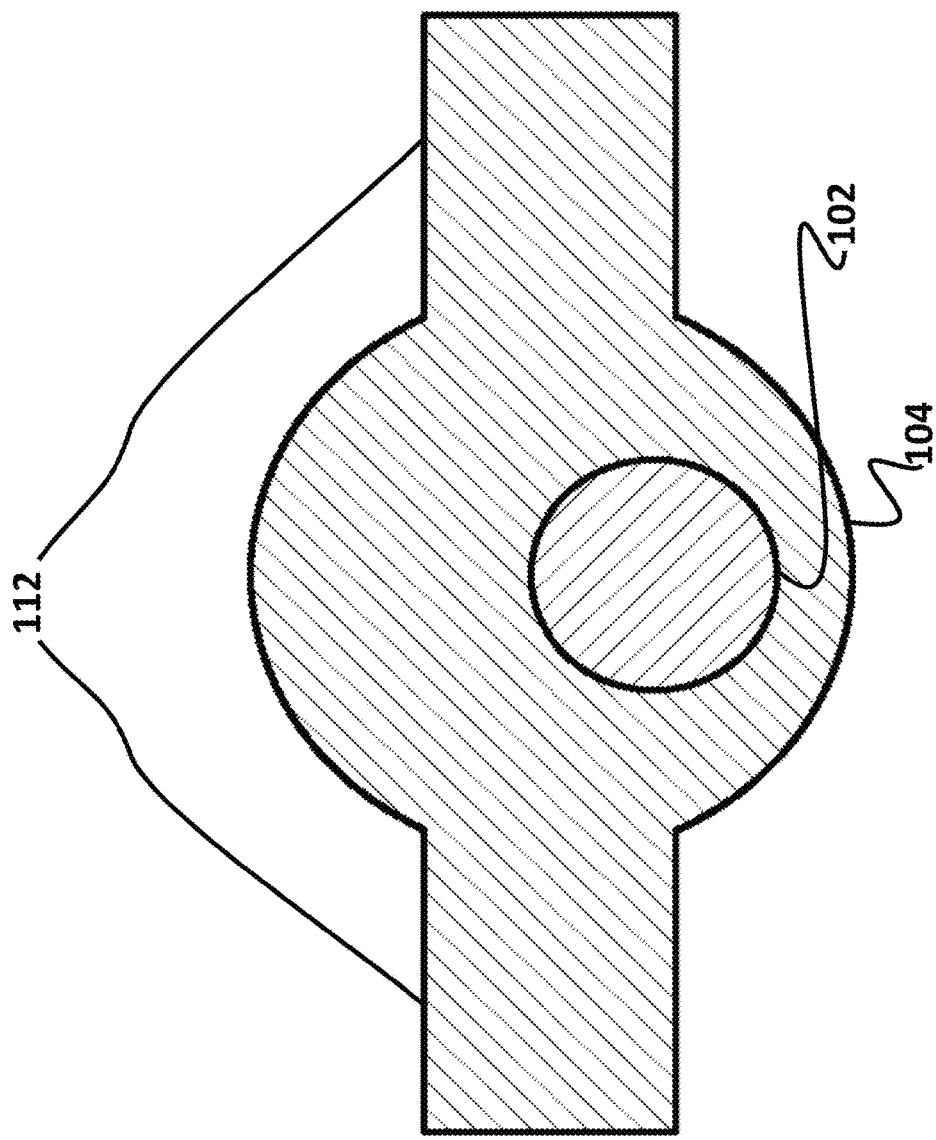

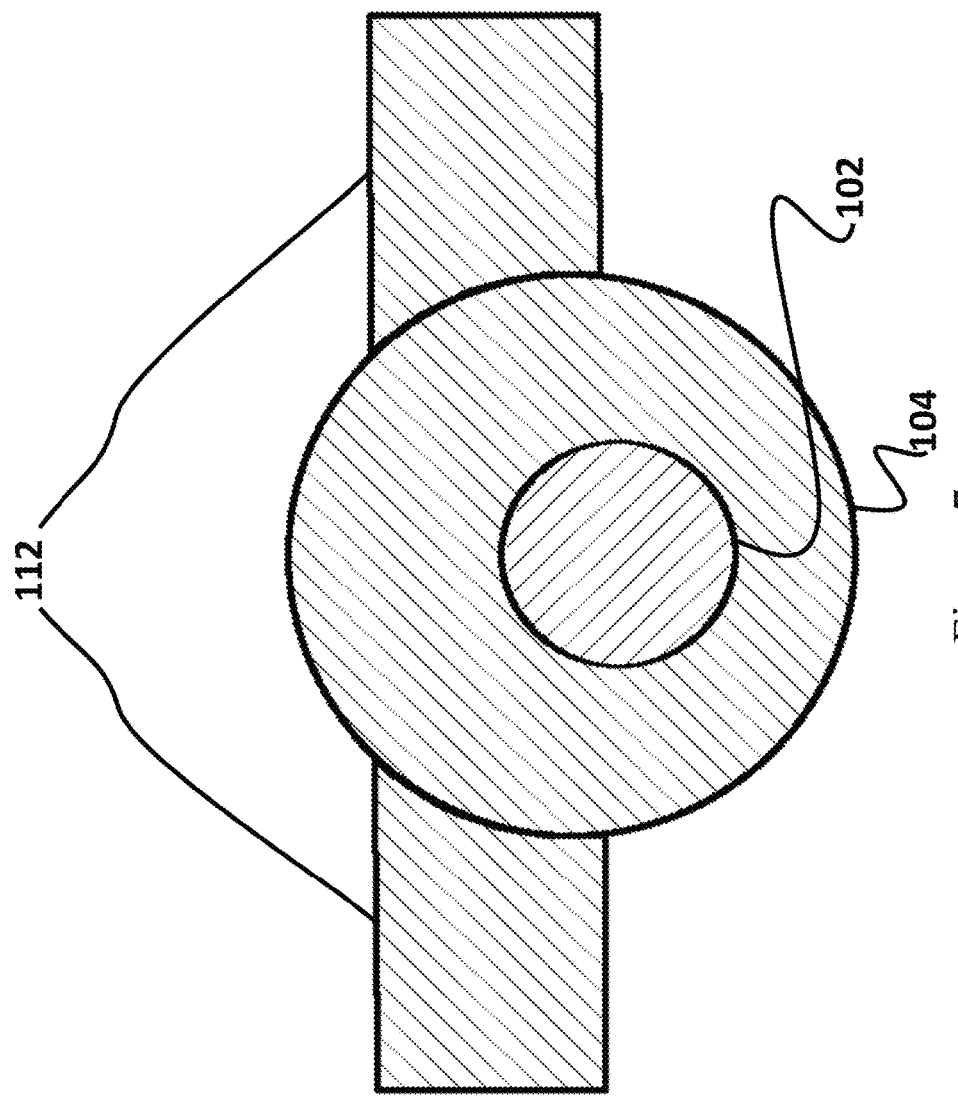

READILY STRIPPABLE CABLE

RELATED APPLICATIONS

This application claims the benefit of U.S. Provisional Application No. 62/070,161, filed Aug. 18, 2014. This application is herein incorporated by reference in its entirety for all purposes.

FIELD OF THE INVENTION

The invention relates to electrical cables, and more particularly, to readily strippable cables particularly suited for use in ductless mini-split AC systems.

BACKGROUND OF THE INVENTION

Existing electrical wires and cable and their associated methods of installation require the use of tools, such as wire strippers and cutters, to expose the conductive elements of the wires in preparation for their connection to an electrical system. This process takes both time and skill and can be time consuming, even for experienced installers, especially when the time consumed is considered over the course of a project. Errors during this operation may also result in the insulation surrounding the conductor being compromised or the wire being severed, requiring additional time to be spent on repair before the work can proceed.

In addition to time and skill requirements, this seemingly simple task also occasionally results in workplace injuries. This is, in part, because the preferred industry tool for stripping such a cable is a utility knife. According to the Massachusetts governmental website, the second most likely reason for an 18-24 year old male to visit the emergency room with a work related injury is being cut or pierced. Notably, 15,154 or 28.1% of visits in Massachusetts emergency rooms result from such injuries annually in Massachusetts alone. Nationally, emergency rooms treat over 750,000 patients annually with work-related cut or pierce injuries. A wire that omitted the use of a utility knife from the stripping operation would inevitably lead to a reduction in such injuries and would help to save millions of dollars annually.

Cables, which contain a plurality of individually-sheathed wires, present an even larger challenge to installers and a significantly larger risk of costly and/or time consuming errors being made. With cables, the outer sheathing must be cut away to expose the jacketing of individual wires for stripping, further increasing the time an electrician, HVAC tech, professional installer, homeowner or other person installing the wiring must spend preparing the wires for installation and the risk of damage to the underlying conductor from accidental puncture of the protective jacket during sheathing removal.

A somewhat related problem involves ductless mini-split A/C systems. In recent years, mini-split ductless AC systems have become popular. These systems are similar to traditional central air conditioning systems in that they locate the noisiest part of the system, the compressor and associated hardware, outdoors. Such systems, however, do not require extensive ductwork to be installed within the home, thus making them a reasonable and cost-effective upgrade to an existing structure.

While the systems themselves are relatively easy to install, relative to traditional centralized air conditioning systems, the cabling for such systems is relatively complicated, requiring AC power wires, DC signal or communications conductors and non-current carrying ground wires to function, each of which must be separated by sheathing in addition to that of the individual wires. There is currently no cable that can provide ease of use, durability and the required connectors for installation of such a system, while meeting code requirements.

What is needed, therefore, are wires and cables that do not require the use of tools to expose the conductors within, enabling their tool-less installation, particularly wires and cables suitable for use in the installation of mini-split ductless AC systems.

SUMMARY OF THE INVENTION

One embodiment of the present invention provides a readily-strippable cable comprising: at least two wires encapsulated by a continuous electrically insulating layer wherein each encapsulated wire is connected to an adjacent wire by a relatively thinner portion of the insulating layer, the insulating layer having at least one relatively weak portion per encapsulated wire that extends along the length of the cable and is substantially uniform in position and strength along the length of the cable; and wherein the weak portion is configured to allow the insulating layer to split along the relatively weak portion and down the length of the cable upon separation of encapsulated wires by application of force against the relatively thinner portion of insulating layer in a direction substantially perpendicular to the length of the cable, thereby exposing the wire without the use of a secondary operation.

Another embodiment of the present invention provides such a cable wherein the relatively weak portion is positioned adjacent each the relatively thinner portion of the insulating layer connecting adjacent wires.

A further embodiment of the present invention provides such a cable wherein no wire is present in the relatively thinner portion of the insulating layer connecting adjacent wires.

Yet another embodiment of the present invention provides such a cable wherein at least one of the encapsulated wires is jacketed.

A yet further embodiment of the present invention provides such a cable wherein the wire jacket of the at least one jacketed inner wire has at least one relatively weak portion that extends along the length of the wire jacket and is substantially uniform in position and strength along the length of the wire jacket; and wherein the relatively weak portion is configured to allow the insulating layer to split along the relatively weak portion and down the length of the wire jacket upon separation of the encapsulated wires by application of force against the relatively thinner portion of insulating layer in a direction substantially perpendicular to the length of the cable, thereby exposing the wire without the use of a secondary operation.

Still another embodiment of the present invention provides such a cable wherein the wire jacket is configured to adhere to the insulating layer of the cable.

A still further embodiment of the present invention provides such a cable wherein the relatively weak portions of the wire jacket and the insulating layer are adjacent one another.

Even another embodiment of the present invention provides such a cable wherein the relatively weak portion is a knit line created during extrusion of the cable.

An even further embodiment of the present invention provides such a cable wherein the relatively weak portion is a knit line created during extrusion of the cable.

A still even another embodiment of the present invention provides such a cable wherein the insulating layer is made of a foamed polymer.

A still even further embodiment of the present invention provides such a cable wherein the foamed polymer is a closed-cell foam polymer.

Still yet another embodiment of the present invention provides such a cable wherein the foamed polymer is an open cell foam polymer.

A still yet further embodiment of the present invention provides such a cable wherein the cable is rated for direct-burial.

Even yet another embodiment of the present invention provides such a cable wherein the at least two wires consist of two AC power wires, a DC signal wire, and a non-current carrying ground wire.

An even yet further embodiment of the present invention provides such a cable wherein the two AC power wires and the DC signal wire are stranded conductors and the non-current carrying ground wire is a solid conductor.

Still even yet another embodiment of the present invention provides such a cable wherein the cable is a UF-B cable.

One embodiment of the present invention provides a method of manufacturing readily-strippable cable comprising: configuring an extrusion die to separate a polymer flow into at least two separate polymer flows; attaching the extrusion die to an extruder; adjusting processing parameters and tooling configuration to cause the polymer flows, during extrusion, to meet when they are relatively cold and under relatively low pressure, thereby creating a uniformly weak portion that extends along the length of the cable to be formed; introducing at least two wires to be made into a readily-strippable cable into the extrusion die for coating with the polymer, wherein the wires are separated from one another; and operating the extruder, thereby creating a readily-strippable cable.

Another embodiment of the present invention provides such a method wherein the extrusion die is a crosshead die.

A further embodiment of the present invention provides such a method wherein the processing parameters and tooling configurations comprise: extrudate temp; compound pressure at tip/die; tip/die temperatures; cooling effects; tool design/construction, including tooling tip wall thickness and hole sizes relative to wire size; vacuum or pressure at die; incoming wire temperature; head tip and die temps, including air cooling or heating of tooling tips from the back of the head and the amount of contact with wires of the tooling tip; crosshead design; and compound type, including the presence of color concentrates.

Yet another embodiment of the present invention provides such a method wherein tubing-style tooling is used in conjunction with vacuum, wherein the vacuum is used to pull the extrudate onto the wire(s).

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 6 is a front-elevation sectional view of a neutral wire portion of a cable wherein the ground wire is offset within cable sheathing that is centered within webbing between adjacent cables (not shown); and FIG. 7 is a front-elevation sectional view of a neutral wire portion of a cable wherein the ground wire is offset within cable sheathing that is offset within webbing between adjacent cables (not shown).

DETAILED DESCRIPTION

The invention is susceptible of many embodiments and variations. What is described here is illustrative, but not limiting, of the scope of the invention.

Figure 1:
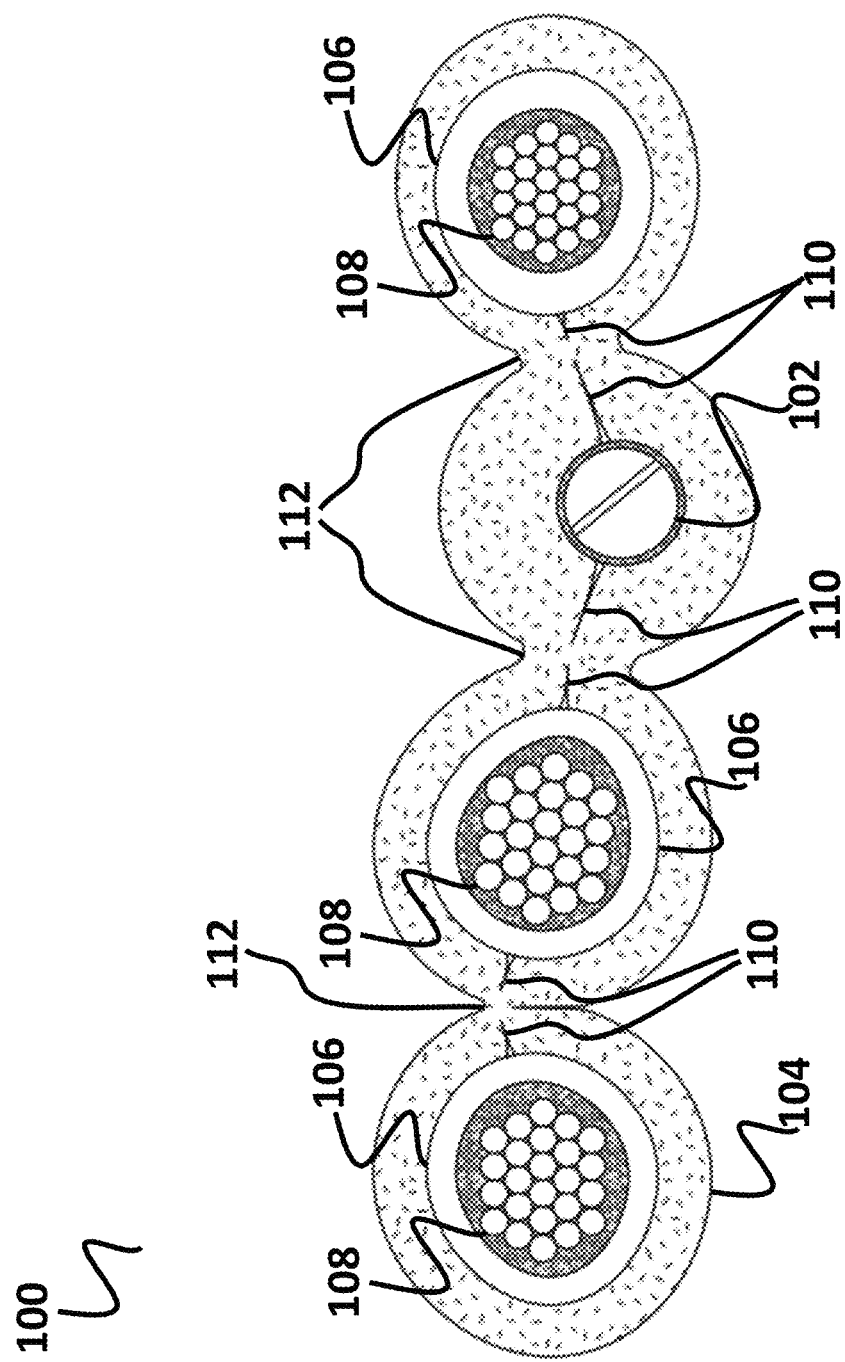
FIG. 1 is a front-elevation sectional view of a four-wire cable having an offset ground wire sheathing configured in accordance with one embodiment of the present invention.

Referring to FIG. 1, a front-elevation sectional view of a four-wire cable 100 having an offset ground wire 102, or bonding conductor 102 (an insulated or uninsulated conductor forming part of the cable 100 assembly which is used for the purpose of connecting non-current carrying parts of electrical equipment to a system grounding conductor), cable sheathing 104 and wire jacketing 106 configured in accordance with one embodiment of the present invention is shown. More specifically, the cable 100 shown comprises: multiple wire cores 108, the portions of insulated wires, which may be stranded and/or solid conductors, lying under a protective covering 106, the wire jacketing 106; a cable sheath 104, the overall protective covering applied to the cable 100; a bonding conductor 102; and wire jacketing 106, which encapsulates at least some of the wire cores 108.

In embodiments, the cable 100 may beneficially be a buried cable 100; a cable 100 installed directly in the earth without use of underground round conduit, also called a direct burial cable 100, and should have reasonable cut-through resistance, the ability of a material to withstand mechanical pressure, usually a sharp edge of prescribed radius, without separation. The cable sheath 104, in embodiments, may be made of a foamed plastic, i.e. plastic having a cellular structure, whether open or closed.

The cable 100 described above may generally be referred to as a bonded flat cable 100, which comprises individually insulated conductors 108, or wire cores 108, lying substantially parallel to one another and bonded together. The cable sheathing 104 connecting adjacent wire cores 108 is referred to as cable webbing 112 Such a cable 100 has numerous applications in electronics, telecommunications, computing and construction. This type of cable 100 is typically manufactured through an extrusion process, where a plastic or elastomeric material and at least two wire cores 108, which may or may not have wire jacketing 106, are forced through an extrusion die, typically a cross-head die, at a controlled rate, thereby imparting a continuous coating of insulation 106 or jacketing 106 to wires 108 to be contained therein. The wires 108 themselves are also often formed in a similar manner. The extrusion process sometimes results in so-called "knit lines" 110 in the final materials.

A knit line 110 is created where two or more flow fronts meet when there is the inability of the two or more flow fronts to "knit" together, or "weld", during the extrusion process. These lines cause locally weak areas in the extruded part and are normally considered defects. They generally occur when the die and/or material temperatures are set too low, resulting in the materials being relatively cold upon meeting, such that they do not bond perfectly. Such "defects" are also sometimes referred to as weld or meld lines 110.

Knit lines 110 are created in cross-head dies because the compound flow is separated in such designs—usually top and bottom—so the compound can be diverted to 'surround' the wire core 108 or wire jacketing 106, as necessary. The compound flows, following separation, are subsequently rejoined via the crosshead design. If the compound is too cool when the separate flows re-join, the compound from the different flow paths will not adhere sufficiently to form a uniform layer over the wire core 108 or wire jacket 106. Similarly, when the knit lines are too loose, the jacketing may not be retained on the wires, while if it is too tight it may not readily strip. Suffice it to say that carefully controlled manufacturing processes are required for knit lines to serve their intended purpose. A non-exhaustive list of key factors that define knit line 110 properties, such as strength and uniformity, include: extrudate temp; compound pressure at tip/die; tip/die temperatures; and cooling effects. Other notable factors include: tool design/construction, including tooling tip wall thickness and hole sizes relative to wire size; vacuum or pressure at die; incoming wire temperature; head tip and die temps, including air cooling or heating of tooling tips from the back of the head and the amount of contact with wires of the tooling tip; crosshead design; and compound type, including the presence of color concentrates.

Now referring specifically to tooling type, there are two primary designs used, namely: "pressure" and "tubing" style tooling. Pressure tooling will generally utilize a relatively sharp angle, as compared to tubing type tooling, where the compound flows around the tip of the tooling and into the die. This design allows high pressure in the extruder to force the extrudate around the wire before being shaped by the die. Tubing' style tooling has a relatively longer tip that generally extends into the die and typically the compound is at a much lower pressure as it is formed around the wire(s). Tubing style tooling may even require a vacuum to be applied to pull the extrudate onto the wire(s).

There are many variations on pressure and tubing style tooling, with some designs being deliberate hybrids of the two concepts. Complex shapes may even combine elements of the designs within the same tooling. Practically speaking, tubing style tooling tends to allow knit lines to form more easily while pressure style tooling tends to prevent or minimize the formation of knit lines. It is also possible to adjust either design during processing by moving the die in relation to the tooling tip. This change slightly affects the amount of pressure or tubing characteristics of the setup. This adjustment can be a way to finely adjust the knit line without resorting to new tooling.

When using either style of tooling, vacuum or positive pressure can be applied to the die to help the extrudate more tightly form to the wires. Vacuum is more common when tubing style tooling is used to pull the extrudate to the wire more tightly and can be used to control the size and uniformity of the knit line on a flat cable construction by pulling the layers more firmly together.

Through careful configuration and control of wire and cable 100 processing conditions, it was found that wires and cables 100 having predictable and uniform knit lines 110 may be created. Although knit lines 110 are usually undesirable, especially when applying an insulation layer, or protective covering, over cables 100, when taken advantage of, as is taught by the current disclosure, correctly positioned and consistent knit lines 110 allow the creation of a cable 100 having key advantages over those of the prior art.

Of particular note to the current disclosure, the cable 100 of FIGS. 1-4 makes novel use of knit lines 110 to allow the cable 100 to be safely and easily stripped in the field, without the use of tools and without sacrificing cable sheathing 104 strength under normal use. In embodiments, as shown in FIGS. 1-4, knit lines 110 may beneficially be positioned proximal to the webbing 112 between adjacent wire cores 108 or wire jacketing 106, if used.

When individual wires within such a cable 100 are separated by the exertion of force applied perpendicularly to the length of the cable 100, against the cable 100 webbing 112 connecting adjacent wires, the presence of knit lines 110 adjacent to this webbing 112 causes the cable sheathing 104 to split. This split results in the cable sheathing 104 readily detaching from the wire jacket 106 or wire core 108 contained within upon further exertion of force, obviating the need for a secondary operation to remove the cable sheathing 104 following wire separation.

Figure 3:
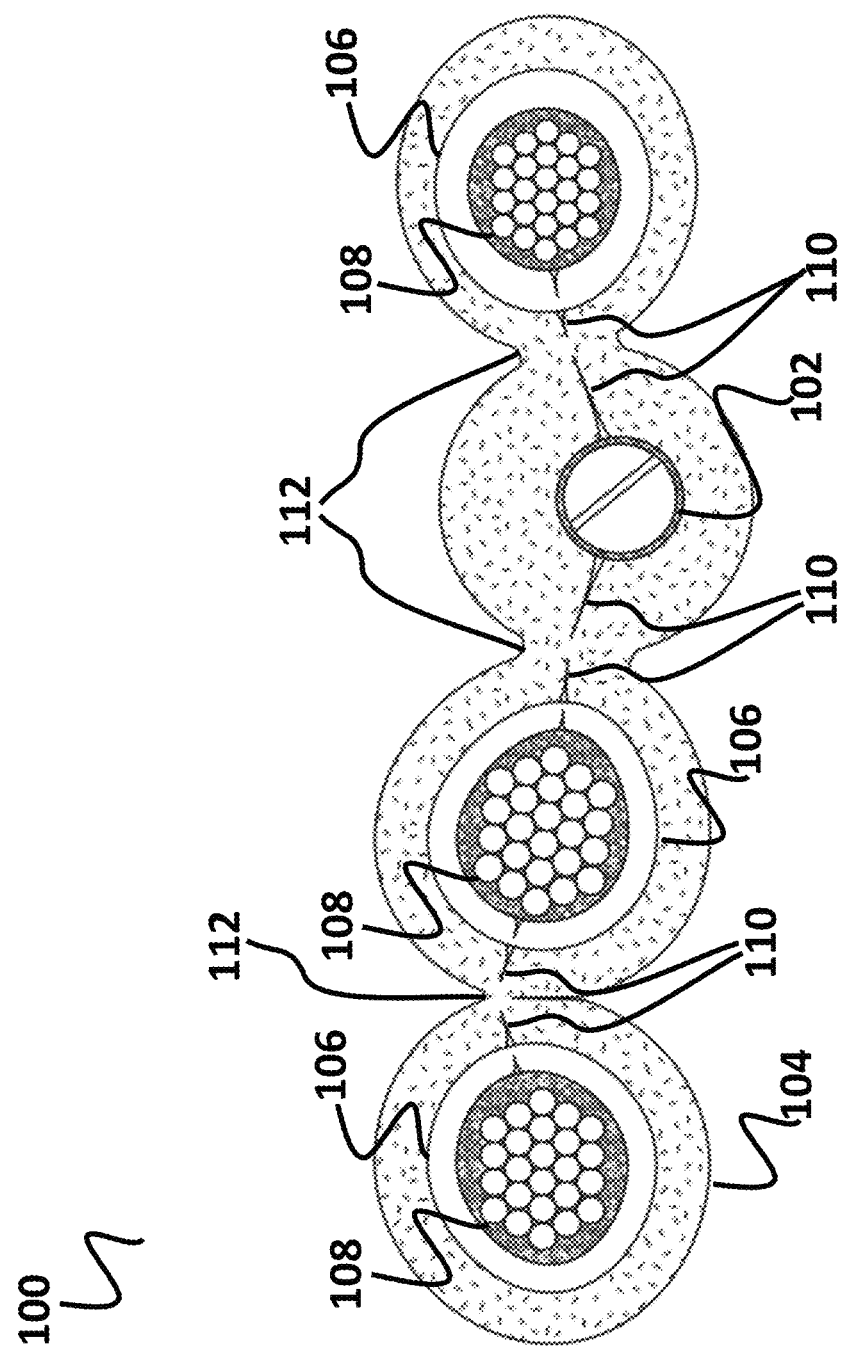
FIG. 3 is a front-elevation sectional view of a four-wire cable having an offset ground wire sheathing and knit lines in both the cable sheathing and wire jackets configured in accordance with one embodiment of the present invention.
Figure 4:
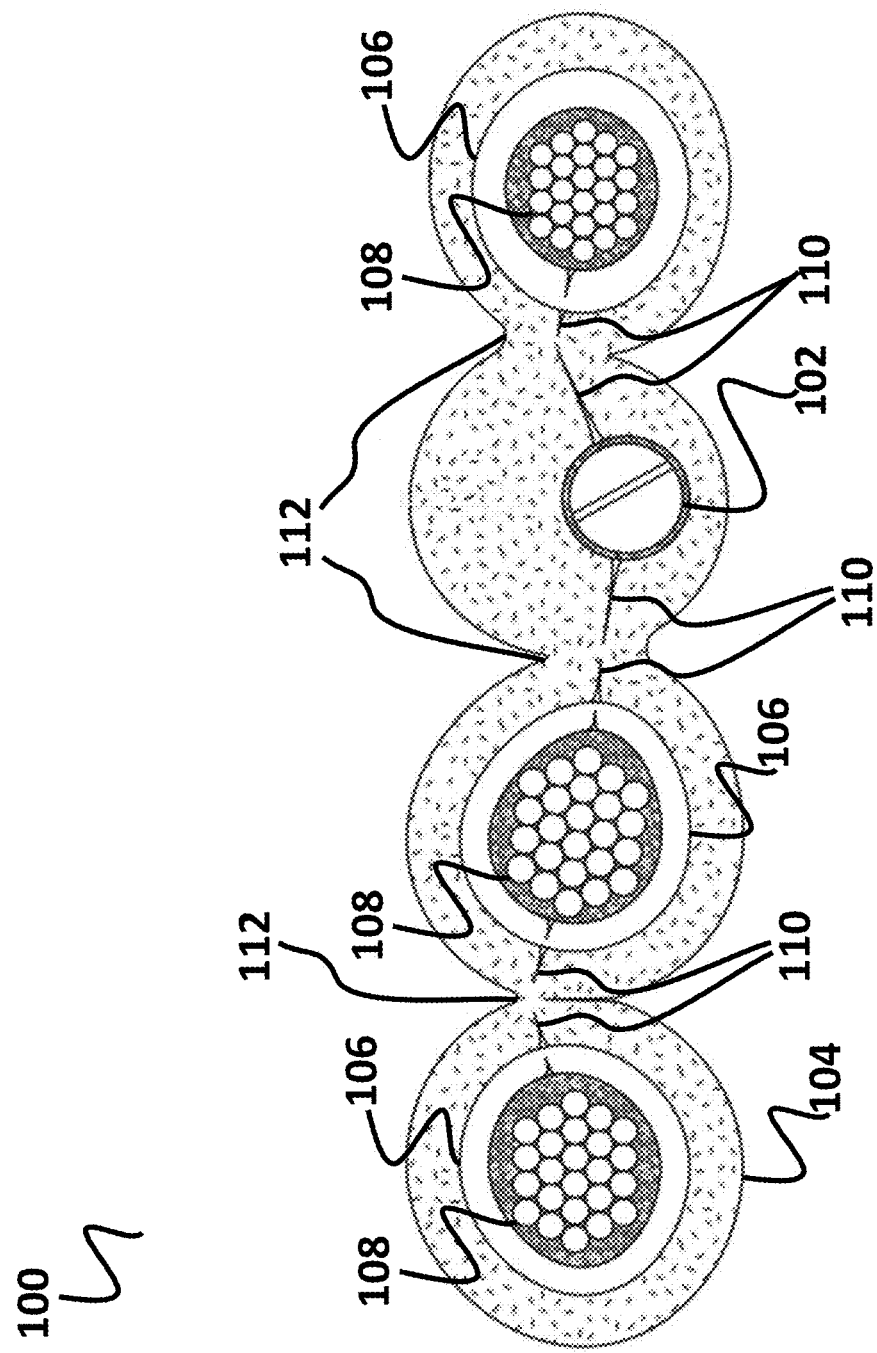
FIG. 4 is a front-elevation sectional view of a four-wire cable having a ground wire offset in its sheathing and knit lines through both the cable sheathing and wire jackets configured in accordance with one embodiment of the present invention.

Now referring to FIGS. 3 and 4, embodiments of the present invention are shown that make use of cables 100 containing jacketed wires 106 having uniform knit lines 110. The uniform wire jacket 106 knit lines 110 allow for a further step in the forming of electrical connections, namely stripping of the wire jacket 106 from the wire core 108, to be performed automatically as the wires contained within the cable 100 are separated. In this design, the cable 100 is separated into individual wire segments by the exertion of force perpendicularly to the lengthwise direction of the cable 100 against the cable webbing 112 connecting adjacent wires in the same way as the previous embodiment. Upon separation of the cable 100 into its component wires, the inner wire jacket 106 knit lines 112 cause the wire jacketing 106, in addition to the cable sheathing 104, to split, allowing it to be quickly and easily removed by an installer, without the use of tools. In embodiments, the wire jacket 106 knit lines 110 may be substantially aligned with those of the cable sheathing 104.

Figure 2:
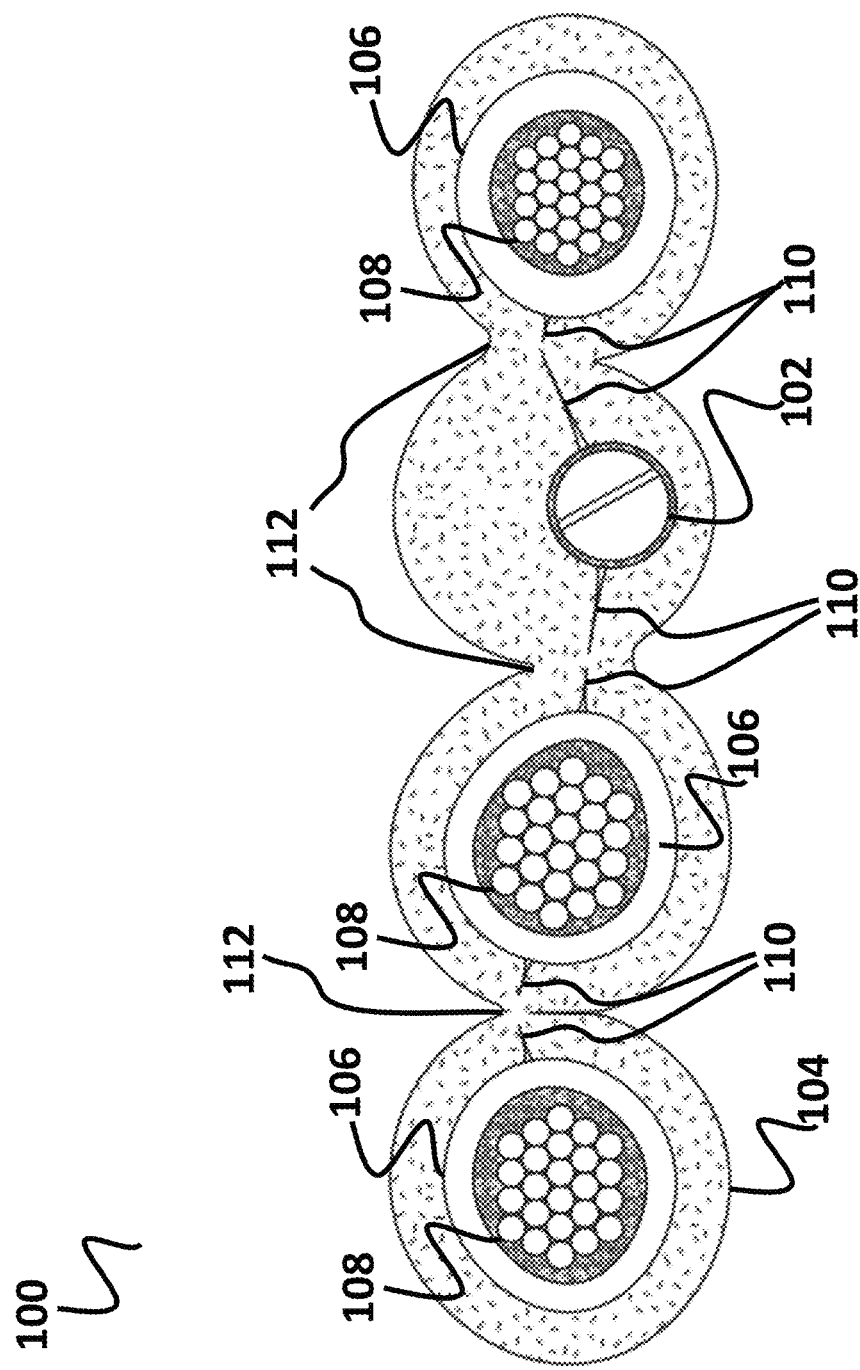
FIG. 2 is a front-elevation sectional view of a four-wire cable having a ground wire offset in its sheathing configured in accordance with one embodiment of the present invention.
Figure 5:
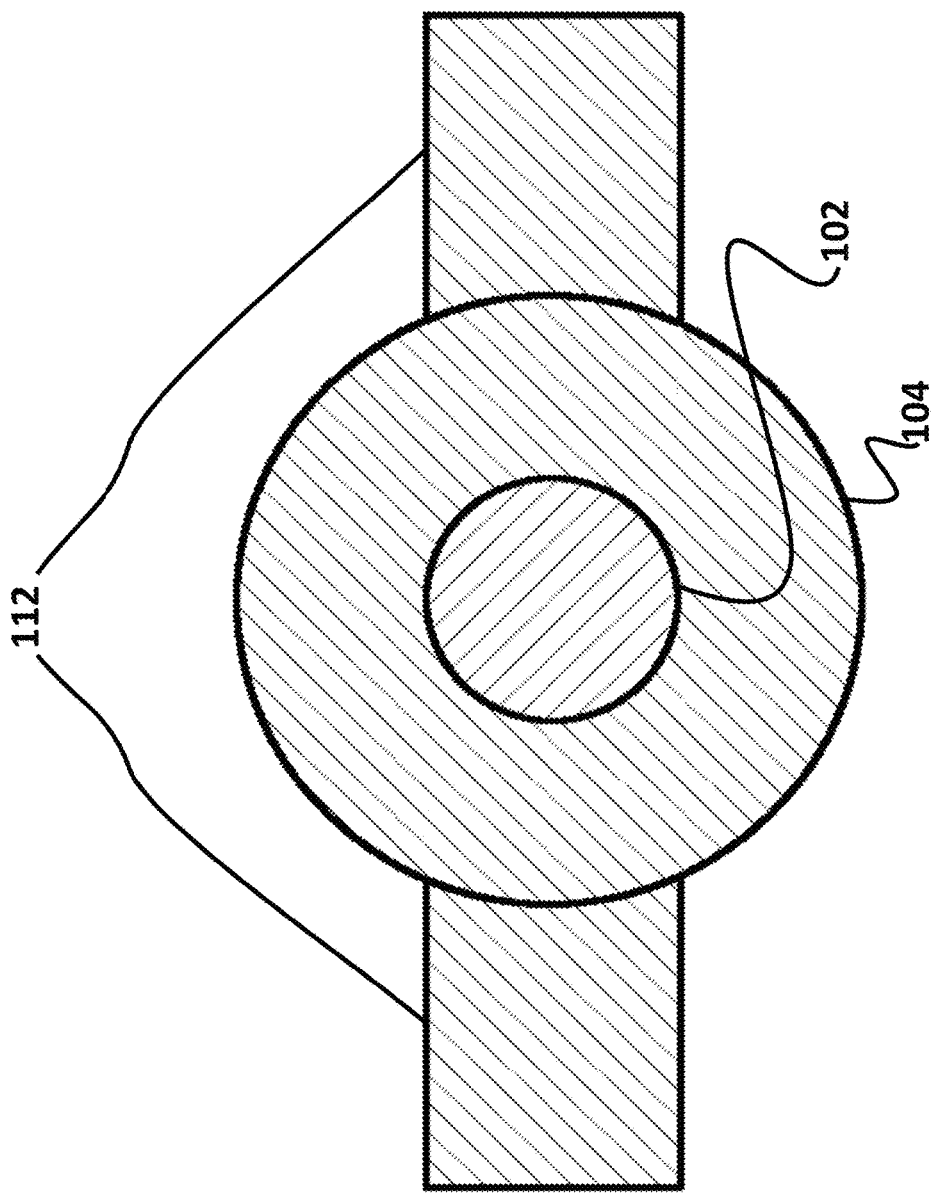
FIG. 5 is a front-elevation sectional view of a neutral wire portion of a cable wherein the ground wire is centered within cable sheathing that is centered within webbing between adjacent cables (not shown)

The use of stranded and/or solid conductors as wire cores 108, different numbers of wires, different shapes of cable 100 and other variations are within the scope of the current disclosure. Furthermore, embodiments of the present invention make use of: a ground wire 102 cable sheathing 104 that is offset from a plane defined by other wires in the cable 100, as shown in FIGS. 1, 3 and 7; a ground wire 102 that is offset within cable sheathing 104 that is otherwise within a plane defined by other wires within the cable 100, as shown in FIGS. 2, 4 and 6; and a ground wire 102 and cable sheathing 104 that is within the plane defined by other wires in the cable, as shown in FIG. 5. The wire core 108 eccentricity, a measure of the displacement of the center of the wire core 108 relative to the center of the cable sheathing 104, of the other wires within the cable 100 as well as the particular gauges of wire used may also change without departing from the scope of the current disclosure.

Additional embodiments particularly suited for use in ductless mini-split air conditioning systems may include an AC power wire, a DC power wire, a ground wire 102 offset from a plane defined by the other wire cores 108 and a signal wire. In such an embodiment, the cable 100 may also beneficially be rated as a direct-buried cable.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A readily-strippable cable comprising:
    at least two wires encapsulated by a continuous electrically insulating layer wherein each encapsulated wire is connected to an adjacent wire by a relatively thinner portion of said insulating layer, said insulating layer having at least one relatively weak portion per encapsulated wire in at least one cross-sectional segment of said continuous electrically insulating layer that is substantially concentric with at least one wire and that extends along the length of the cable and is substantially uniform in position and strength along the length of said cable; and
    wherein said weak portion is configured to allow the insulating layer to split along the relatively weak portion and down the length of said cable upon separation of encapsulated wires by application of force against said relatively thinner portion of insulating layer in a direction substantially perpendicular to the length of said cable, thereby separating said wires from one another and simultaneously separating the insulating layer from said wire, without the use of a secondary operation.

2. The cable of claim 1 wherein said relatively weak portion is positioned adjacent each said relatively thinner portion of said insulating layer connecting adjacent wires.

3. The cable of claim 1 wherein no wire is present in said relatively thinner portion of said insulating layer connecting adjacent wires.

4. The cable of claim 1 wherein at least one of said encapsulated wires is jacketed.

5. The cable of claim 4 wherein said wire jacket of said at least one jacketed inner wire has at least one relatively weak portion that extends along the length of said wire jacket and is substantially uniform in position and strength along the length of said wire jacket; and
    wherein said relatively weak portion is configured to allow the insulating layer to split along the relatively weak portion and down the length of said wire jacket upon separation of said encapsulated wires by application of force against said relatively thinner portion of insulating layer in a direction substantially perpendicular to the length of said cable, thereby exposing said wire without the use of a secondary operation.

6. The cable of claim 5 wherein said wire jacket is configured to adhere to said insulating layer of said cable, thereby allowing the wire to be stripped from the cable and the conductor to be stripped from the wire in a single, tool-less step.

7. The cable of claim 5 wherein said relatively weak portions of said wire jacket and said insulating layer are adjacent one another.

8. The cable of claim 5 wherein said relatively weak portion is a knit line created during extrusion of said cable.

9. The cable of claim 1 wherein said relatively weak portion is a knit line created during extrusion of said cable.

10. The cable of claim 1 wherein said insulating layer is made of a foamed polymer.

11. The cable of claim 10 wherein said foamed polymer is a closed-cell foam polymer.

12. The cable of claim 10 wherein said foamed polymer is an open cell foam polymer.

13. The cable of claim 1 wherein said cable is rated for direct-burial.

14. The cable of claim 1 wherein said at least two wires consist of two AC power wires, a DC signal wire, and a non-current carrying ground wire.

15. The cable of claim 14 wherein said two AC power wires and said DC signal wire are stranded conductors and said non-current carrying wire is a solid conductor.

16. The cable of claim 1 wherein said cable is a UF-B cable.

17. A method of manufacturing readily-strippable cable comprising:
    configuring an extrusion die to separate a polymer flow into at least two separate polymer flows;
    attaching said extrusion die to an extruder;
    introducing at least two wires to be made into a readily-strippable cable into said extrusion die for coating with said polymer, wherein said wires are separated from one another;
    adjusting processing parameters and tooling configuration to cause said polymer flows, during extrusion, to meet when they are relatively cold and under relatively low pressure, thereby creating a uniformly weak portion in at least one cross-sectional segment of the polymer coating concentric with and surrounding at least one wire and that extends along the length of said cable to be formed; and
    operating said extruder, thereby creating a readily-strippable cable.

18. The method of claim 17 wherein said extrusion die is a crosshead die.

19. The method of claim 18 wherein said processing parameters and tooling configurations comprise:
    extrudate temp;
    compound pressure at tip/die;
    tip/die temperatures;
    cooling effects;
    tool design/construction, including tooling tip wall thickness and hole sizes relative to wire size;
    vacuum or pressure at die;
    incoming wire temperature; head tip and die temps, including air cooling or heating of tooling tips from the back of the head and the amount of contact with wires of the tooling tip;
    crosshead design; and
    compound type, including the presence of color concentrates.

20. The method of claim 17 wherein tubing-style tooling is used in conjunction with vacuum, wherein said vacuum is used to pull the extrudate onto the wire(s).

* * * * *